(12) United States Patent
Ohmura

(10) Patent No.: US 10,481,346 B2
(45) Date of Patent: Nov. 19, 2019

(54) OPTICAL CONNECTION MEMBER, OPTICAL CONNECTOR, AND OPTICAL FIBER HAVING CONNECTOR

(71) Applicant: SUMITOMO ELECTRIC INDUSTRIES, LTD., Osaka-shi, Osaka (JP)

(72) Inventor: Masaki Ohmura, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 16/080,333

(22) PCT Filed: Feb. 24, 2017

(86) PCT No.: PCT/JP2017/007140
§ 371 (c)(1),
(2) Date: Aug. 28, 2018

(87) PCT Pub. No.: WO2017/150379
PCT Pub. Date: Sep. 8, 2017

(65) Prior Publication Data
US 2019/0072726 A1 Mar. 7, 2019

(30) Foreign Application Priority Data
Mar. 3, 2016 (JP) ................. 2016-041022

(51) Int. Cl.
G02B 6/38 (2006.01)
G02B 6/44 (2006.01)
G02B 6/36 (2006.01)

(52) U.S. Cl.
CPC .......... G02B 6/3885 (2013.01); G02B 6/381 (2013.01); G02B 6/3839 (2013.01);
(Continued)

(58) Field of Classification Search
None
See application file for complete search history.

(56) References Cited

U.S. PATENT DOCUMENTS

| 5,862,281 A | 1/1999 | Shahid |
| 9,002,168 B2 | 4/2015 | McColloch |

(Continued)

FOREIGN PATENT DOCUMENTS

| JP | 2000-214348 A | 8/2000 |
| JP | 2003-195116 A * | 7/2003 |

(Continued)

OTHER PUBLICATIONS

English translation of written opinion for PCT/JP2017/007140, dated May 16, 2017. (Year: 2017).*

(Continued)

Primary Examiner — Michael Stahl
(74) Attorney, Agent, or Firm — Drinker Biddle & Reath LLP

(57) ABSTRACT

An optical connection member is used for optical connection of a plurality of optical fibers, the optical connection member including: an end surface facing another optical connection member at the time of the optical connection; and a holding portion holding the plurality of optical fibers, wherein the holding portion is provided with a plurality of holding holes which are opened in the end surface, extend from the end surface in a first direction intersecting with the end surface, and hold the plurality of optical fibers, the end surface includes a first area, a second area, and a third area which are sequentially arranged along a second direction intersecting with the first direction, openings of the plurality of holding holes are arranged in a row in the second direction in the first area and the third area.

4 Claims, 22 Drawing Sheets

(52) U.S. Cl.
CPC ............. *G02B 6/3897* (2013.01); *G02B 6/44* (2013.01); *G02B 6/3644* (2013.01); *G02B 6/3863* (2013.01); *G02B 6/3887* (2013.01)

(56) References Cited

U.S. PATENT DOCUMENTS

| | | | |
|---|---|---|---|
| 2003/0072537 A1* | 4/2003 | Eichenberger | G02B 6/3807 385/89 |
| 2003/0215206 A1* | 11/2003 | Nakajima | G02B 6/3672 385/137 |
| 2004/0065548 A1* | 4/2004 | Kaku | C25D 1/02 205/75 |
| 2005/0084216 A1 | 4/2005 | Yang et al. | |
| 2008/0101751 A1* | 5/2008 | Luther | G02B 6/3885 385/59 |
| 2011/0103803 A1* | 5/2011 | Kolesar | G02B 6/4472 398/142 |
| 2012/0189259 A1* | 7/2012 | Manes | G02B 6/44 385/135 |
| 2014/0140660 A1* | 5/2014 | Buff | G02B 6/3885 385/59 |
| 2015/0162982 A1 | 6/2015 | Buff et al. | |
| 2015/0326316 A1* | 11/2015 | Watanabe | H04B 10/2504 398/58 |
| 2017/0153397 A1* | 6/2017 | deJong | G02B 6/3826 |
| 2017/0160495 A1* | 6/2017 | Ohtsuka | G02B 6/3885 |
| 2017/0184800 A1* | 6/2017 | de Jong | G02B 6/3885 |
| 2017/0192180 A1* | 7/2017 | Andrus | G02B 6/3847 |
| 2018/0188463 A1* | 7/2018 | Szumacher | G02B 6/448 |

FOREIGN PATENT DOCUMENTS

| | | |
|---|---|---|
| JP | 2004-12845 A | 1/2004 |
| JP | 2009-229504 A | 10/2009 |
| JP | 2016-501383 A | 1/2016 |
| WO | WO-2014/078261 A1 | 5/2014 |
| WO | WO-2016/053851 A1 | 4/2016 |

OTHER PUBLICATIONS

Japanese Standard Association, "F13 Type connectros for optical fiber ribbons," 2001 (C 5982), pp. 586-614, including partial English translation.

\* cited by examiner

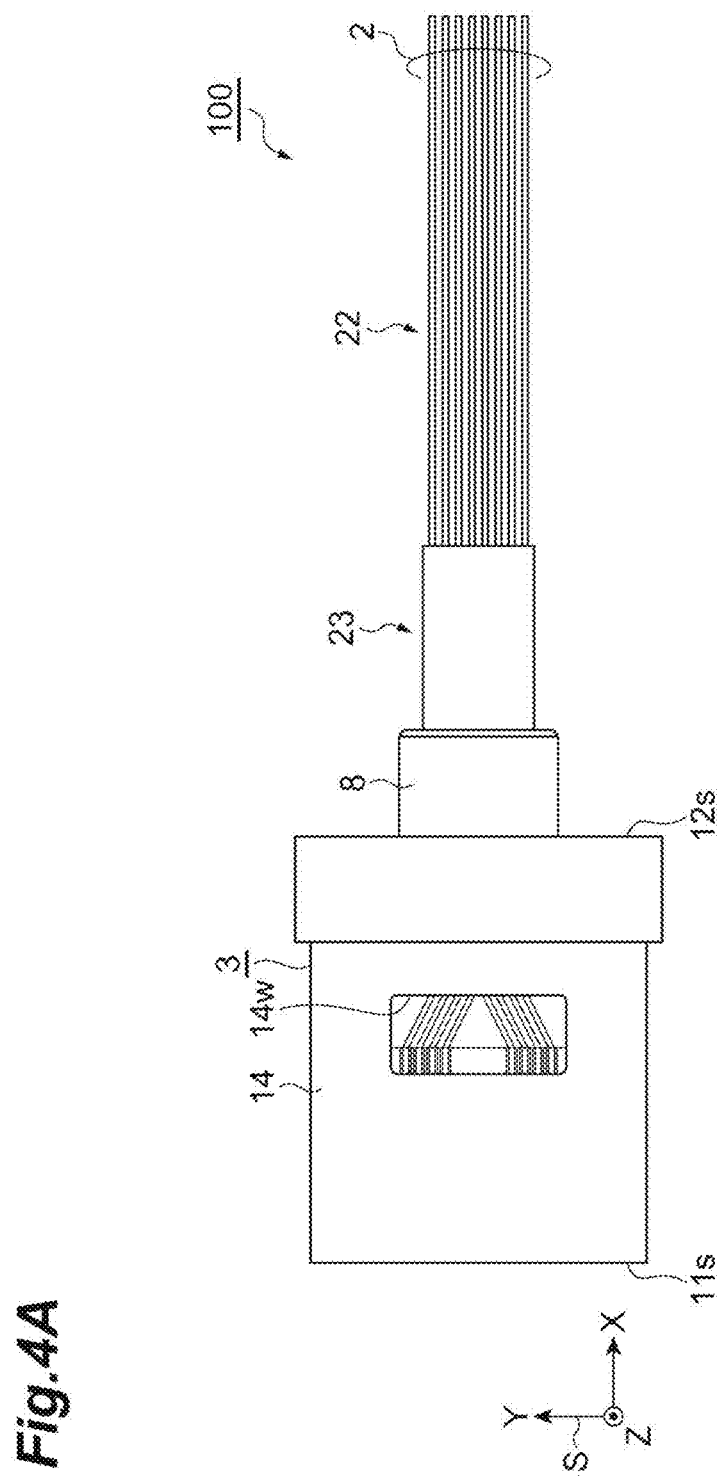

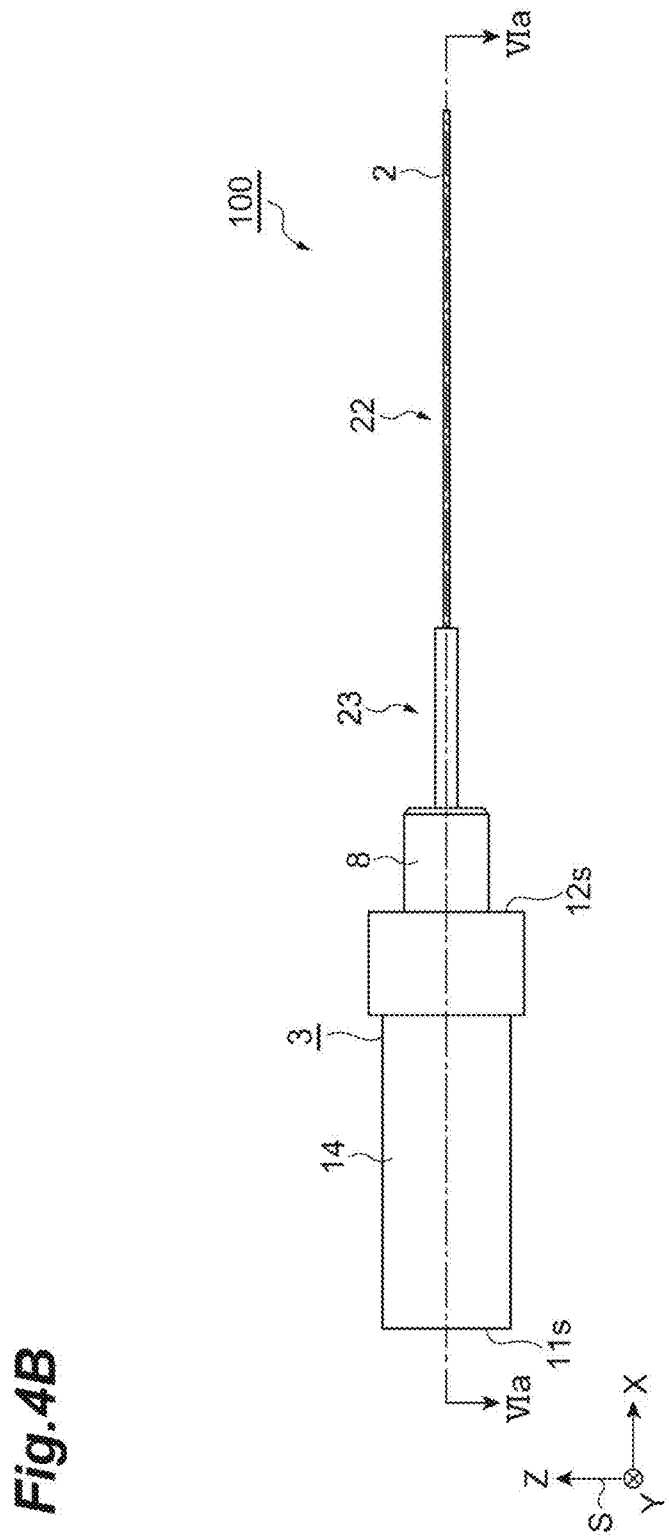

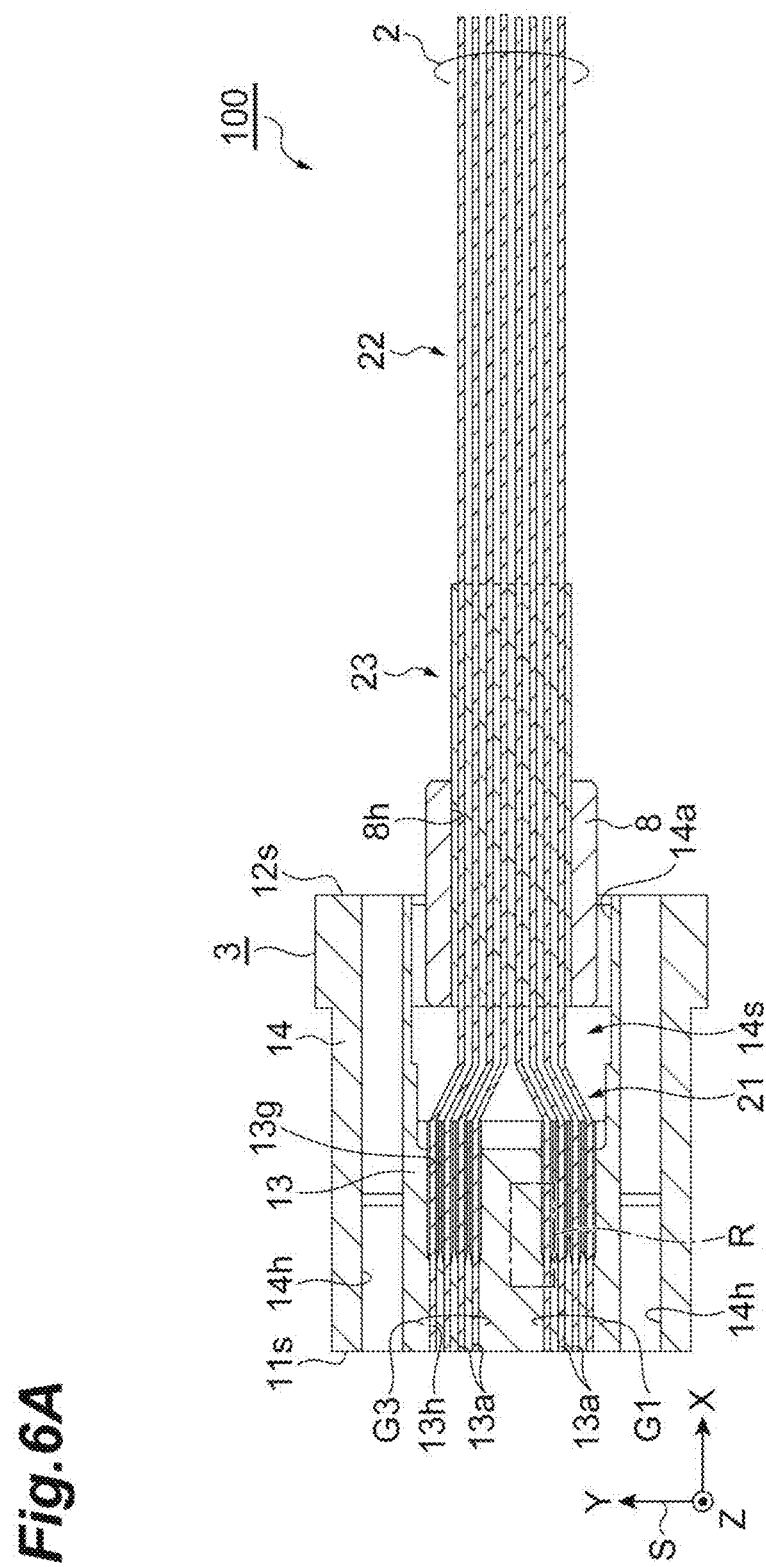

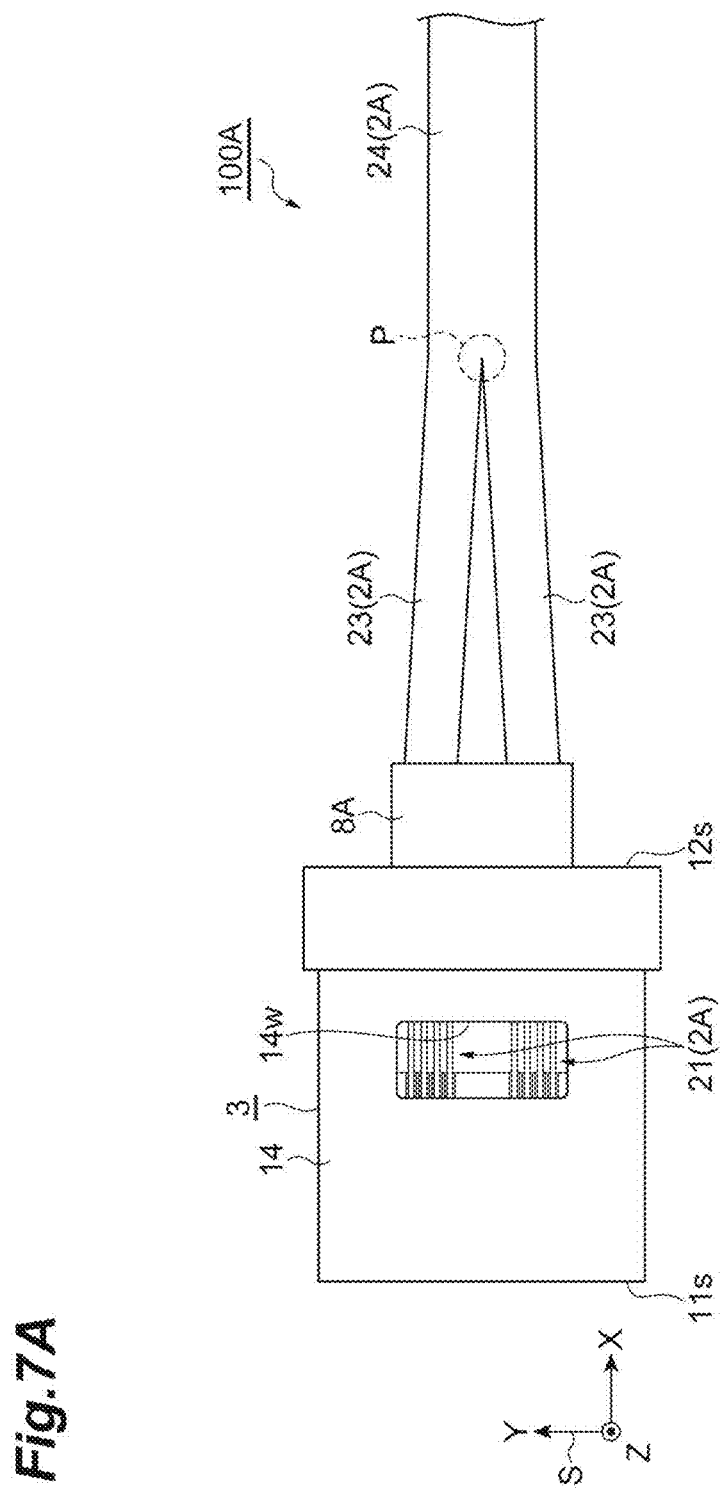

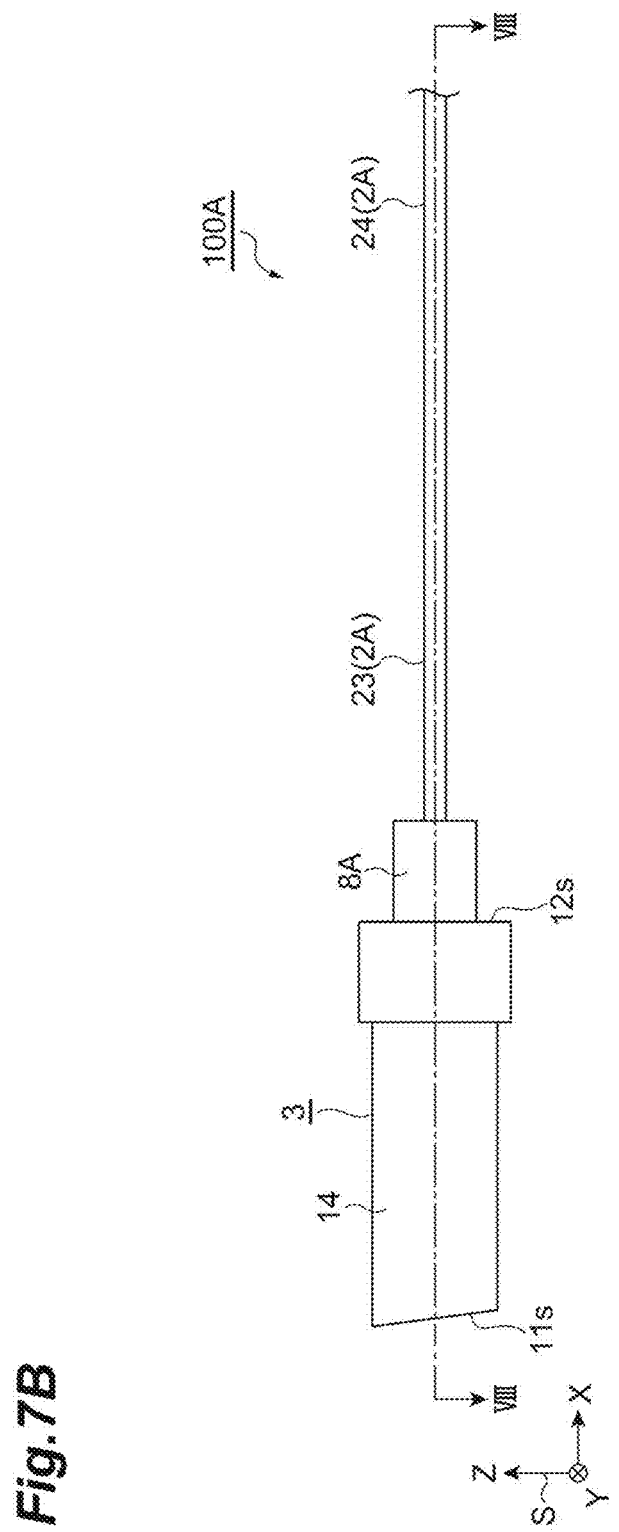

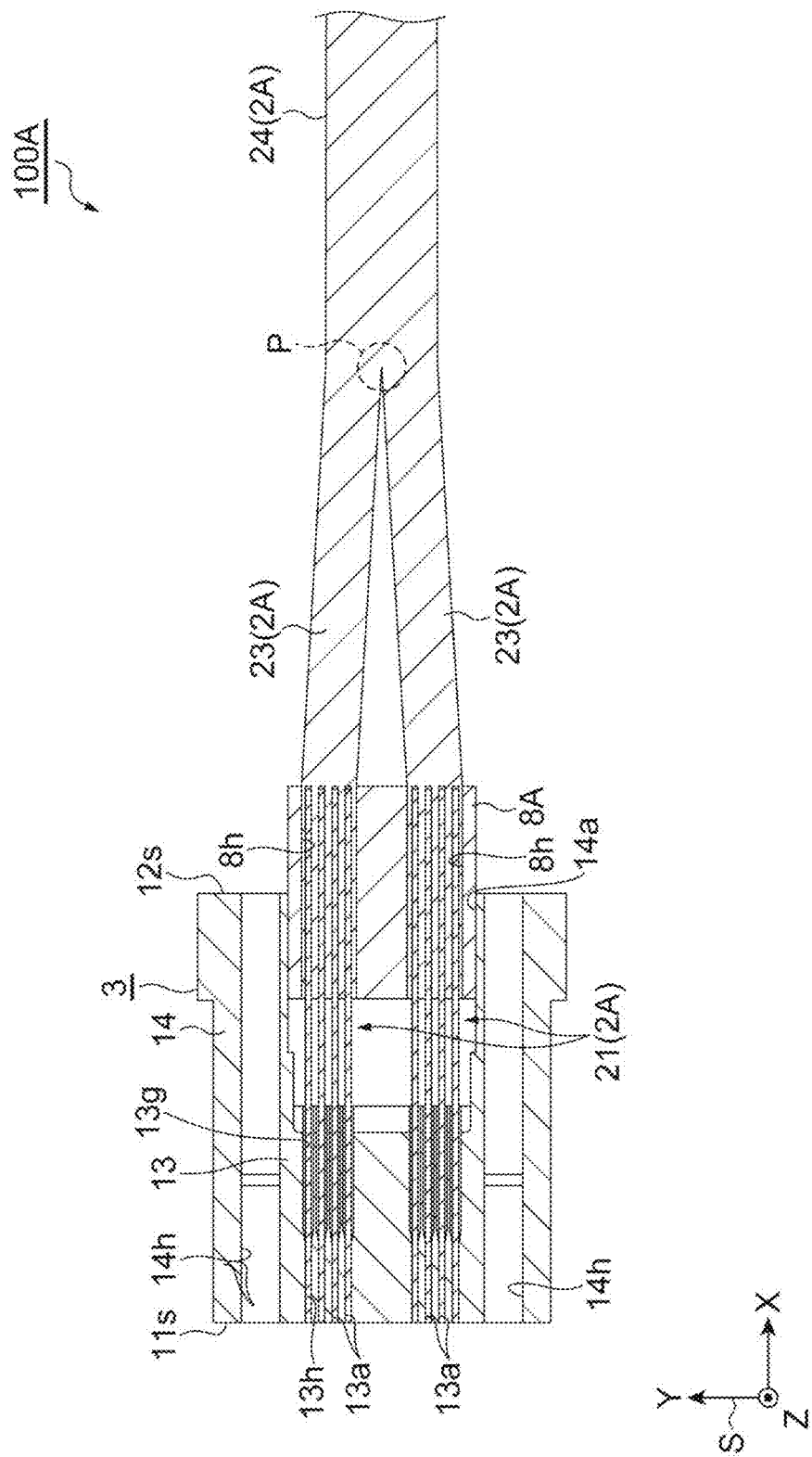

OPTICAL CONNECTION MEMBER, OPTICAL CONNECTOR, AND OPTICAL FIBER HAVING CONNECTOR

TECHNICAL FIELD

The present subject matter relates generally to optical connection members, optical connectors, and optical fibers with a connector.

This application is based upon and claims the benefit of priority from Japanese Patent Application No. 2016-041022, filed on Mar. 3, 2016, the entire contents of which are incorporated herein by reference.

BACKGROUND ART

Optical fibers are used in various types of communication networks for facilitating data transfer at a rate of at least one gigabit per second (i.e., "Gbps" or "G"). Traditional 1G and 10G networks, in which data is transferred at a rate of 1 Gbps and 10 Gbps, respectively, are based upon a 12-count ("12 ct") fiber and/or a structured cabling system (SCS) utilizing a 12 ct fiber basis. That is, the base unit of network hardware including cables, ribbon cables, trunk cables, connectors, converters, adapters, patches, etc., of traditional networks is a 12 ct fiber. Patent Literature 1 and Non Patent Literature 1 disclose an example of a connector including a 12 ct basis.

CITATION LIST

Patent Literature

Patent Literature 1: US Patent Application Publication No. 2015/0162982

Non Patent Literature

Non Patent Literature 1: Japanese Industrial Standard C 5982 F13 type multi-fiber optical connector

SUMMARY OF INVENTION

An optical connection member of the present disclosure is used for optical connection of a plurality of optical fibers, the optical connection member including: an end surface facing another optical connection member at the time of the optical connection; and a holding portion holding the plurality of optical fibers, wherein the holding portion is provided with a plurality of holding holes which are opened in the end surface, extend from the end surface in a first direction intersecting with the end surface, and hold the plurality of optical fibers, the end surface includes a first area, a second area, and a third area which are sequentially arranged along a second direction intersecting with the first direction, openings of the plurality of holding holes are arranged in a row in the second direction in the first area and the third area, and a center interval between the openings mutually adjacent through the second area is larger than a center interval between the openings mutually adjacent in the first area and the third area.

BRIEF DESCRIPTION OF DRAWINGS

FIG. 4A is a top view of a ferrule illustrated in FIG. 3.

FIG. 4B is a side view of the ferrule illustrated in FIG. 3.

FIG. 6A is a cross-sectional view taken along line VIa-VIa of FIG. 4B.

FIG. 7A is a top view of a ferrule according to a modification.

FIG. 7B is a side view of the ferrule according to the modification.

FIG. 8 is a cross-sectional view taken along line VIII-VIII of FIG. 7B.

DESCRIPTION OF EMBODIMENTS

Problems to be Solved by Present Disclosure

The demand for faster data transfer (e.g., at a rate of 40G, 100G, 400G, etc.) is ever increasing, in part due to the onset of smart technology, which utilize fiber networks and/or components thereof for accessing (i.e., sending/receiving) data from network carriers/providers, media outlets, the cloud, data applications, social media applications, etc. Network providers utilize data centers for housing network hardware or components, including servers, transceivers, receivers, communication modules, converters, connectors, plates, patches, racks, routers, switches, ports, etc., for supporting 1G/10G/40G/100G networks. Conventional networks and network data centers utilize hardware based upon the traditional 12 ct fiber as a fiber basis.

In faster networks, such as in 40G and 100G networks, only 8 of the 12 optical fibers are typically utilized for facilitating data transmission. Thus, conventional networks have extensive amounts of unused (e.g., wasted) optical fibers. This is costly and expensive to manufacture and maintain. In addition, expensive converters or conversion modules must be used to convert, upgrade, and/or otherwise scale slower networks (i.e., 1G, 10G) into faster networks (i.e., 40G, 100G, etc.).

Figure 1:
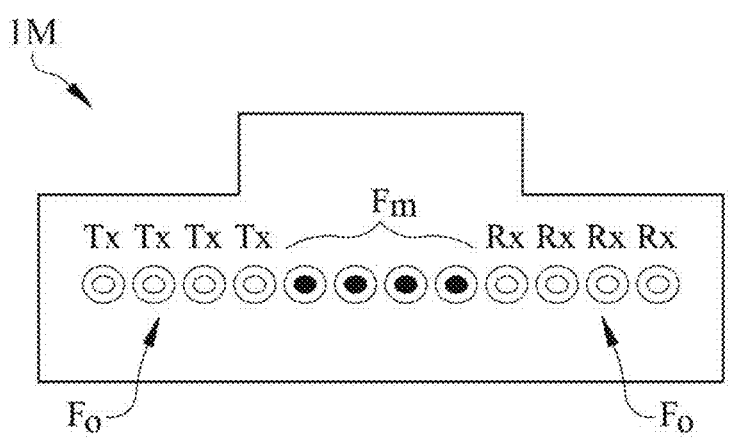
FIG. 1 illustrates a conventional multi-fiber push on (MPO) connector device, generally designated MPO, utilized in conventional fiber networks.

FIG. 1 illustrates a conventional multi-fiber push on (MPO) connector device, generally designated MPO, utilized in conventional fiber networks. An MPO connector 1M includes a 12 ct basis. As noted above, in 40G and 100G networks, only 8 of the 12 optical fibers may be used for facilitating data transmission (e.g., 4×TX and 4×RX). The middle four optical fibers, generally designated FM, are present in the middle ferrule positions of the MPO connector 1M, but are unused and may be referred to as "dark". The outer optical fibers generally designated FO are disposed on outermost positions of the MPO connector 1M and are used for transmission/receipt of data in a communication network.

In traditional networks using traditional practices of 12 ct SCS, the middle four optical fibers FM result in an optical fiber waste of about 33%, as roughly about ⅓ of the optical fibers are unused. This is wasteful, expensive, and inefficient, especially for networks utilizing optical multi-mode (OM) fibers as described by ISO 11801 and/or as defined in TIA-492-AAAD. The 33% optical fiber waste amounts to a considerable waste in terms of dollars, materials, resources, and space, which is unacceptable, especially in large networks utilizing data centers having hundreds of ports. Therefore, it is desirable to suppress the waste of optical fibers.

In addition, when the end surface of the ferrule is polished, there is a case where the protrusion amount from the end surface of the optical fiber arrayed along the end surface varies. The inventors of the present subject matter have found that there is a tendency that a variation in protrusion amount increases as the number of arrangement of optical fibers increases. Such a variation in the protrusion amount of the optical fiber causes a reduction in the stability of the optical connection. That is, at the time of optical connection by the MPO connector 1M, a pressing force is applied to the optical fibers protruding from the respective end surfaces of the ferrules of two MPO connectors 1M so as to abut against each other. At this time, if the variation as described above occurs with respect to the protrusion amount of the optical fiber, the pressing force also varies and the optical connection becomes unstable.

An object of the present disclosure is to provide an optical connection member, an optical connector, and an optical fiber with a connector, which can suppress the optical fiber waste and improve the stability of the optical connection.

Effect of Present Disclosure

According to the present disclosure, it is possible to provide an optical connection member, an optical connector, and an optical fiber with a connector, which can suppress the optical fiber waste and improve the stability of the optical connection.

Description of Embodiments

Hereinafter, an embodiment of an optical connection member, an optical connector, and an optical fiber with a connector, according to the present subject matter, will be described.

The optical connection member according to the embodiment is an optical connection member used for optical connection of a plurality of optical fibers, including an end surface facing another optical connection member at the time of the optical connection and a holding portion holding the plurality of optical fibers, wherein the holding portion is provided with a plurality of holding holes which are opened in the end surface, extend from the end surface in a first direction intersecting with the end surface, and hold the plurality of optical fibers, the end surface includes a first area, a second area, and a third area which are sequentially arranged along a second direction intersecting with the first direction, openings of the plurality of holding holes are arranged in a row in the second direction in the first area and the third area, and a center interval between the openings mutually adjacent through the second area is larger than a center interval between the openings mutually adjacent in the first area and the third area.

The optical connection member includes the end surface facing another optical connection member at the time of optical connection and a holding portion holding the optical fiber at the holding hole. The end surface includes the first area, the second area, and the third area. The openings of the holding holes are arranged in a row in the first area and the third area. The center interval between the openings mutually adjacent through the second area is larger than the center interval between the openings mutually adjacent in the first area and the third area. That is, the plurality of optical fibers is divided into a group held in the holding holes opened in the first area and a group held in the holding holes opened in the third area. Due to this, the number of the optical fibers is reduced as compared to a case where the holding holes opened in the second area are formed to further hold the optical fibers. Therefore, the optical fiber waste is suppressed.

Furthermore, as described above, the plurality of optical fibers is divided into the two groups. That is, as compared with a case where all the plurality of optical fibers are arranged in a row as one group, the number of the optical fibers arranged per group is reduced. Therefore, the variation in protrusion amount from the end surface of the optical fiber is reduced. Therefore, it is possible to suppress the occurrence of the variation in the pressing force between the optical fibers and improve the stability of the optical connection.

In the optical connection member according to the embodiment, the center intervals between the openings mutually adjacent in the first area and the third area may be respectively constant. In this case, it is possible to hold the optical fibers at constant intervals in each of the first area and the third area.

In the optical connection member according to the embodiment, the holding portion may be provided with eight holding holes. In this case, eight optical fibers (e.g., 4×TX and 4×RX) used to facilitate data transmission in the 40G networks and 100G networks can be held.

In the optical connection member according to the embodiment, the center intervals between the openings mutually adjacent in the first area and the third area may be 100 μm to 300 μm. Alternatively, the center intervals between the openings mutually adjacent in the first area and the third area may be 245 μm to 255 μm. In this case, it is possible to hold the adjacent optical fibers at an interval of 120 μm to 130 μm.

The optical connector according to the embodiment may include the optical connection member and a housing for holding the optical connection member thereinside. This optical connector includes the optical connection member. Therefore, it is possible to suppress the optical fiber waste and improve the stability of the optical connection.

The optical fiber with the connector according to the embodiment may include the optical connector and the plurality of optical fibers attached to the optical connector, wherein one end portions of the plurality of optical fibers may be held in the holding holes in the holding portion. The optical fiber with the connector includes the optical connector. Therefore, it is possible to suppress the optical fiber waste and improve the stability of the optical connection.

In the optical fiber with the connector according to the embodiment, a covering may be removed from a portion of the plurality of optical fibers located outside the optical connection member. In the optical fiber with the connector according to the embodiment, the plurality of optical fibers may be integrated outside the optical connection member. In the optical fiber with the connector according to the embodiment, the plurality of optical fibers may be divided into two parts inside the optical connection member. In the optical fiber with the connector according to the embodiment, the other end portions of the plurality of optical fibers may be attached to another optical connector. In the optical fiber with the connector according to the embodiment, another optical connector may have the same configuration as the optical connector.

Details of Embodiments

Hereinafter, an embodiment of an optical connection member, an optical connector, and an optical fiber with a connector, according to the present subject matter, will be described with the drawings. In the description of the drawings, the same elements or the corresponding elements are denoted by the same reference numerals, and a redundant description thereof will be omitted. Note that the present subject matter is not limited to these examples, but is indicated by the scope of claims, and includes the meaning equivalent to the claims and all changes within the scope.

Figure 2A:
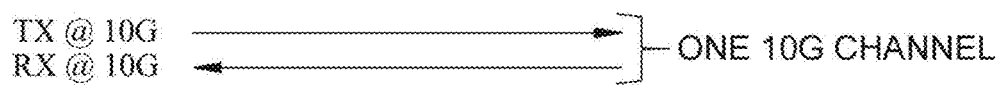
FIG. 2A is a schematic diagram illustrating parallel optics used to facilitate data transmission at 10G signals, according to some embodiments.

The optical fiber with the connector according to the embodiment utilize parallel optics for simultaneously transmitting and receiving data over multiple optical fibers within a network and respective data centers. For example, as FIG. 2A illustrates, one 10G channel can consist of two parallel fibers for transmitting/receiving communication signals simultaneously. One optical fiber transmits data at 10G and another optical fiber receives data simultaneously at 10G. As used herein, the acronym or abbreviation "TX" denotes the transmission, transmit, and/or transmittal or transmitting of data or information. The acronym "RX" denotes the reception, to receive, and/or receiving of data or information. Thus, two parallel fibers (e.g., 1×TX and 1×RX) are necessary for one 10G channel or port in 10G/40G/100G/400G networks.

Figure 2B:
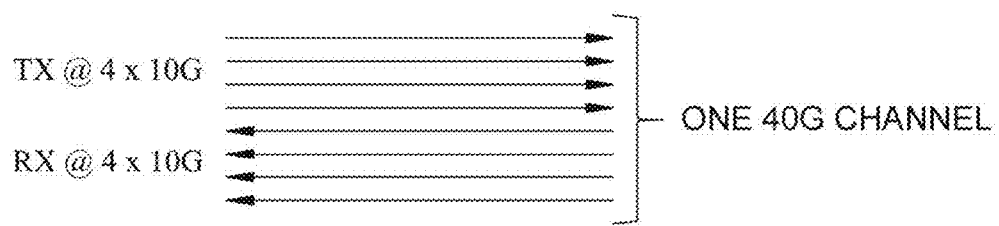
FIG. 2B is a schematic diagram illustrating parallel optics used to facilitate data transmission at 40G signals, according to some embodiments.

To provide faster data transfer, one 40G channel may include a total of eight optical fibers, for example, 4×TX and 4×RX. As FIG. 2B illustrates, one 40G channel consists only of four optical fibers for transmitting data (i.e., each at 10G) and four optical fibers for receiving data (i.e., each at 10G). Thus, only eight parallel fibers can be utilized for one 40G channel or port, where each optical fiber is configured to TX/RX at 10G.

Figure 2C:
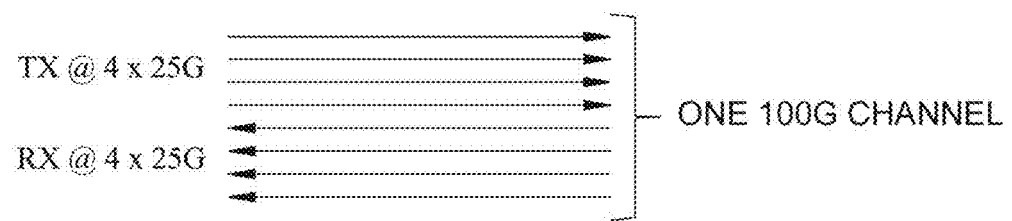
FIG. 2C is a schematic diagram illustrating parallel optics used to facilitate data transmission at 100G or more than 100G signals, according to some embodiments.

FIG. 2C illustrates one 100G channel or port utilizing parallel optics, in which the signal across each optical fiber is 25G as opposed to 10G. One 100G channel can also include a total of eight optical fibers, for example, 4×TX and 4×RX. As FIG. 2C illustrates, one 100G channel can consist of four optical fibers for transmitting data (i.e., each at 25G) and four optical fibers for receiving data (i.e., each at 25G). Thus, only eight parallel fibers can be utilized for one 100G channel or port, where each optical fiber is configured to TX/RX at 25G FIGS. 2B and 2C comprise a "4 by" parallel optics in which four separate channels are utilized for transmitting (TX) and receiving (RX) data.

Notably, the optical fiber with the connector according to the present embodiment advantageously allow for 100% end-to-end fiber utilization within a passive network, whereby all eight optical fibers of an 8 ct fiber basis are utilized, accounting for at least approximately 0% fiber waste. The 8 ct fiber can be utilized as the basic fiber structure for the optical fiber with the connector according to the present embodiment in terms of network design, management, construction, and overall economy of the network.

Figure 3:
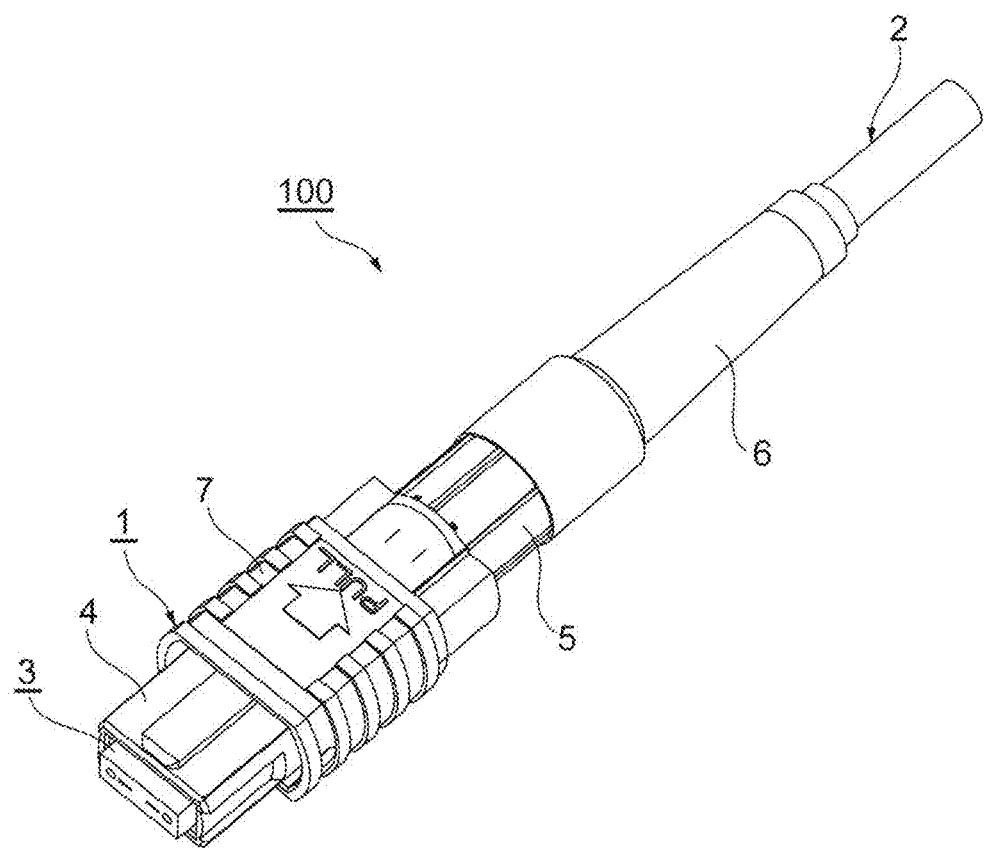
FIG. 3 is a perspective view illustrating an example of an optical fiber with a connector according to an embodiment.

FIG. 3 is a perspective view illustrating an example of an optical fiber with a connector according to the present embodiment. An optical fiber with the connector 100 is utilized in networks communicating at least at 40G, such as 100G in other embodiments, the optical fiber with the connector 100 is utilized in networks communicated at more than 100G, such as 400G. The optical fiber with the connector 100 is based upon a reduced fiber count, such as an 8 ct fiber according to some embodiments.

The optical fiber with the connector 100 includes an optical connector 1 and a plurality of optical fibers 2 attached to the optical connector 1 (see FIG. 4A). The optical connector 1 is, for example, a multi-fiber push on (MPO) connector. The optical connector 1 is connected to another MPO connector (not illustrated) through an optical adapter (not illustrated). The optical connector 1 includes a ferrule (optical connection member) 3, a housing 4, a fixing member 5, and a boot 6.

The ferrule 3 is used for the optical connection of the plurality of optical fibers 2. Details of the ferrule 3 will be described later. The housing 4 holds the ferrule 3 thereinside. In the housing 4, a coupling 7 for pulling out the optical connector 1 from the optical adapter is attached so as to be movable in the front-rear direction of the housing 4. The fixing member 5 has a cylindrical shape. The fixing member 5 is connected to a rear end portion of the housing 4. The fixing member 5 sandwiches and fixes the plurality of optical fibers 2. The boot 6 is attached to a rear side portion of the fixing member 5. The boot 6 protects the optical fibers 2.

Figure 5A:
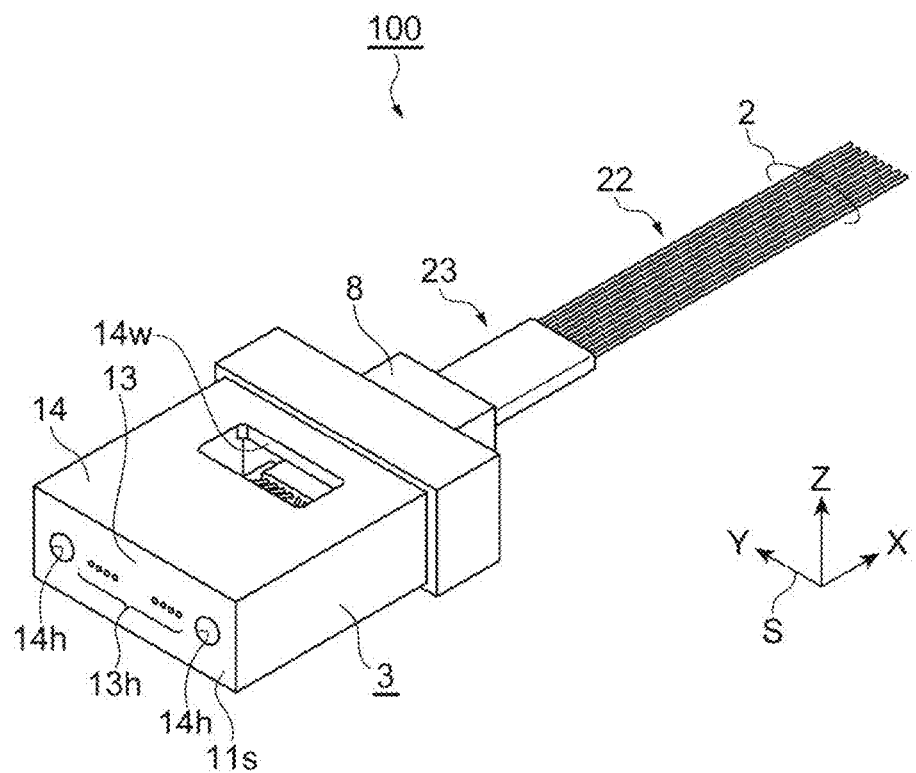
FIG. 5A is a perspective view of the ferrule illustrated in FIG. 3.
Figure 5B:
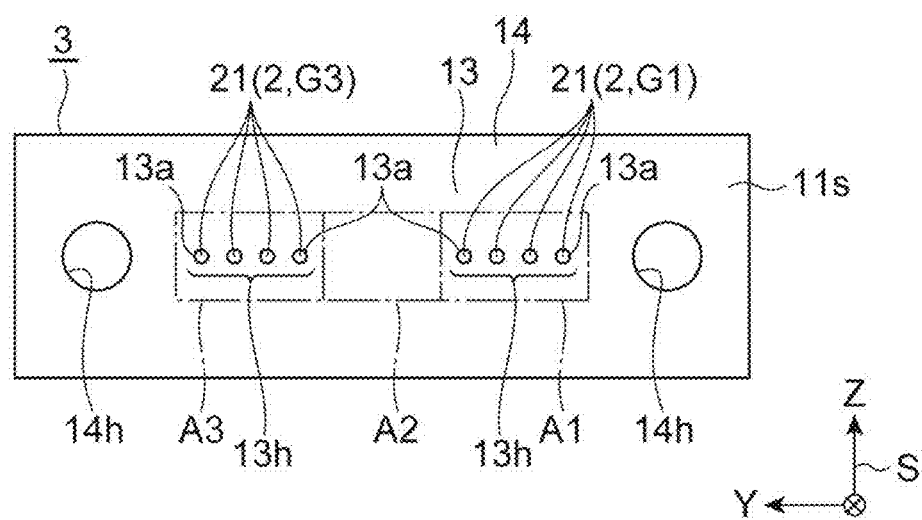
FIG. 5B is a diagram illustrating an example of an end surface of the ferrule illustrated in FIG. 3.
Figure 6B:
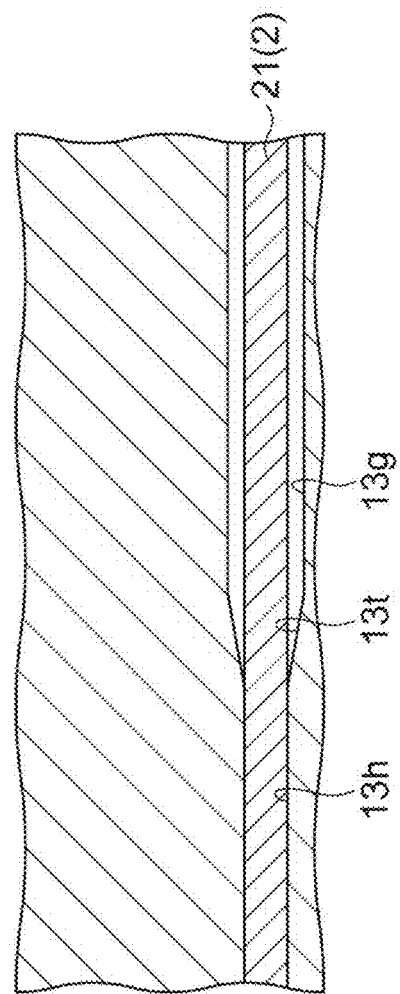
FIG. 6B is an enlarged view of a region R of FIG. 6A.

Subsequently, the ferrule 3 will be described in detail. FIG. 4A is a top view of the ferrule illustrated in FIG. 3. FIG. 4B is a side view of the ferrule illustrated in FIG. 3. FIG. 5A is a perspective view of the ferrule illustrated in FIG. 3. FIG. 5B is a diagram illustrating an example of the end surface of the ferrule illustrated in FIG. 3. FIG. 6A is a cross-sectional view taken along line VIa-VIa of FIG. 4B. FIG. 6B is an enlarged view of a region R of FIG. 6A. For ease of understanding, orthogonal coordinate system S is shown in each drawing.

A plurality of optical fibers 2 is arranged on a ferrule 3. In addition, a boot 8 is attached to a rear side portion of the ferrule 3. The plurality of optical fibers 2 is arranged inside the ferrule 3 through the boot 8.

The ferrule 3 includes a first end surface (end surface) 11s and a second end surface 12s arranged along a first direction (for example, X-axis direction of orthogonal coordinate system S). The ferrule 3 includes a holding portion 13 and a frame portion 14. The holding portion 13 is integrally formed with the frame portion 14 so as to be surrounded by the frame portion 14. The holding portion 13 and the frame portion 14 constitute the first end surface 11s at one end. The frame portion 14 constitutes the second end surface 12s at the other end. The holding portion 13 holds the plurality of optical fibers 2.

The first end surface 11s is a surface facing the end surface of another ferrule at the time of optical connection. The first end surface 11s includes a first area A1, a second area A2, and a third area A3 sequentially arranged along a second direction (for example, Y-axis direction of orthogonal coordinate system S) intersecting with the first direction.

The first area A1, the second area A2, and the third area A3 are provided inside the first end surface 11s so as to be surrounded by a portion of the first end surface 11s corresponding to the frame portion 14 when viewed from the first direction. As one example, the first area A1, the second area A2, and the third area A3 are portions corresponding to the holding portion 13 on the first end surface 11s. The first area A1, the second area A2, and the third area A3 are located between a pair of guide pin insertion holes 14h described later on the first end surface 11s. The lengths of the first area A1 and the third area A3 in the first direction are, for example, the same.

The holding portion 13 is provided with a plurality of holding holes 13h for holding the plurality of optical fibers 2. The holding hole 13h extends from the first end surface 11s toward the second end surface 12s along the first direction. That is, the holding hole 13h extends in a direction intersecting with the first end surface 11s. The holding holes 13h are arranged in a row along the second direction (for example, Y-axis direction of orthogonal coordinate system S) intersecting with the first direction. The number of the holding holes 13h is, for example, four or more, for example, eight.

The holding hole 13h is opened in the first end surface 11s of the ferrule 3. Openings 13a of the plurality of holding holes 13h are arranged in a row along the second direction in the first area A1 and the third area A3. The optical fiber 2 is exposed to the first end surface 11s through the opening 13a in a state of being held in each holding hole 13h. Therefore, the plurality of optical fibers 2 is divided into a group G1 held in the holding holes 13h opened in the first area A1 and a group G3 held in the holding holes 13h opened in the third area A3. In the second area A2, the holding holes 13h are not provided. In other words, a portion extending from the second area A2 of the holding portion 13 in the second direction is solid.

The number of the openings 13a of each of the first area A1 and the third area A3 (that is, the number of the holding holes 13h and the number of the optical fibers 2) is, for example, two or more, for example, four. The numbers of the openings 13a of the first area A1 and the third area A3 can be the same as each other. The dimensions of the first area A1 and the third area A3 in the second direction are, for example, the same as each other and are the dimensions capable of arranging four openings 13a at equal intervals. The dimension of the second area A2 in the second direction is, for example, the same as the dimensions of the first area A1 and the third area A3 and is the dimension at which four openings (that is, the optical fibers 2) can be arranged.

The center intervals between the openings 13a mutually adjacent in the first area A1 and the third area A3 are, for example, constant. The center interval between the openings 13a is a distance between the centers of the openings 13a in the second direction. The center intervals between the openings 13a mutually adjacent in the first area A1 and the third area A3 are, for example, 100 μm to 300 μm. In addition, the center interval between the openings 13a mutually adjacent through the second area A2 is larger than the center interval between the openings 13a mutually adjacent in the first area A1 and the third area A3 by the dimension of at least the second area A2. The center interval between the openings 13a mutually adjacent through the second area A2 is, for example, 900 μm to 1,100 μm.

Herein, the plurality of holding holes 13h extends in parallel to each other. Therefore, the center interval between the openings 13a is the center interval between the holding holes 13h.

In the holding portion 13, a plurality of fiber arrangement grooves 13g is formed such that the optical fibers 2 can be arranged. The fiber arrangement grooves 13g extend from an end of the first end surface 11s side of the holding hole 13h toward the second end surface 12s along the first direction and reaches an end of the holding portion 13 of the second end surface 12s side. The fiber arrangement grooves 13g are connected to the holding holes 13h through a taper portion 13t gradually reduced from the second end surface 12s toward the first end surface 11s. Thus, the number of the fiber arrangement grooves 13g is equal to the number of the holding holes 13h. Therefore, the fiber arrangement grooves 13g are not formed in a portion extending from the second area A2 of the holding portion 13 in the first direction. However, the fiber arrangement grooves 13g may be formed in the corresponding portion. The fiber arrangement grooves 13g are arranged in a row along the second direction.

The frame portion 14 constitutes the outer shape of the ferrule 3. The frame portion 14 has, for example, a rectangular parallelepiped shape. In the frame portion 14, space 14s opened in the second end surface 12s is formed. The holding holes 13h and the fiber arrangement grooves 13g face the space 14s and are opened in the space 14s. When viewed from a third direction (for example, Z-axis direction of orthogonal coordinate system S) intersecting with the first direction and the second direction, a window portion 14w is formed in a portion corresponding to the space 14s of the frame portion 14. Thus, the space 14s is also opened in the window portion 14w.

In addition, a pair of guide pin insertion holes 14h, which are used to connect the optical connector 1 to another optical connector or the like, are formed in the frame portion 14. The guide pin insertion holes 14h extend along the first direction so as to reach the second end surface 12s from the first end surface 11s. The guide pin insertion holes 14h are arranged so as to sandwich the holding holes 13h from both sides of the second direction.

The optical fibers 2 are attached to the optical connector 1 (in particular, the ferrule 3). The number of the optical fibers 2 is equal to the number of the holding holes 13h. For example, the number of the optical fibers 2 is eight. In this case, the optical fibers 2 include, for example, four TX fibers and four RX fibers. Each of the optical fibers 2 includes one end portion 21, other end portion 22, and an intermediate portion 23 between the one end portion 21 and the other end portion 22. The one end portion 21 is located inside the ferrule 3. The one end portion 21 is held by the holding portion 13 in a state of being inserted into the holding hole 13h and arranged in the fiber arrangement groove 13g.

The other end portion 22 is located outside the ferrule 3. That is, the optical fiber 2 extends to the outside of the ferrule 3 beyond the second end surface 12s. In the other end portion 22 of the optical fiber 2, another ferrule (optical connector: not illustrated) is attached. Another ferrule may be a conventional ferrule and may be a ferrule having the same configuration as the ferrule 3.

The plurality of optical fibers 2 is integrated by being covered with a tape covering in a lump, for example, in a state of being arranged in a row in the intermediate portion 23. On the other hand, the plurality of optical fibers 2 is not covered with at least a tape covering and not integrated in the one end portion 21 and the other end portion 22. More specifically, each of the optical fibers 2 includes a glass fiber and a fiber covering that covers the glass fiber. In the optical fiber 2, the glass fiber is exposed by removing the tape covering and the fiber covering at the other end portion 22. That is, in the optical fiber 2, the covering is removed in a portion located at the outside of the ferrule 3.

In addition, in the optical fiber 2, the tape covering is removed and the fiber covering remains at a part of the intermediate portion 23 side of the one end portion 21. Furthermore, in the optical fiber 2, the tape covering and the fiber covering are removed and the glass fiber is exposed at a part of a side (front end side) opposite to the intermediate portion 23 of the one end portion 21. The one end portion 21 of the optical fiber 2, for example, is located in the fiber arrangement groove 13g at a part where the glass fiber is exposed, and is inserted into the holding hole 13h.

The boot 8 is formed in, for example, a rectangular shape. A part of the boot 8 is inserted from the opening 14a of the frame portion 14 in the second end surface 12s into the inside (space 14s) of the ferrule 3. The remaining part of the boot 8 is protruded from the second end surface 12s to the outside of the ferrule 3. In the boot 8, a single through-hole 8h is formed herein. The plurality of optical fibers 2 is inserted into the through-hole 8h in a lump.

Herein, a part of the intermediate portion 23 of the optical fiber 2 is disposed inside the through-hole 8h. Therefore, the plurality of optical fibers 2 is disposed in the inside of the ferrule 3 through the boot 8 and extends to the outside of the ferrule 3. The boot 8 is bonded to the ferrule 3 by, for example, a resin adhesive. The adhesive is supplied from the window portion 14w of the frame portion 14 to the inside of the space 14s, bonds the optical fiber 2 to the holding hole 13h and the fiber arrangement groove 13g, and bonds the boot 8 to the frame portion 14.

FIG. 7A is a top view of an optical fiber with a connector according to a modification. FIG. 7B is a side view of the optical fiber with the connector according to the modification. FIG. 8 is a cross-sectional view taken along line VIII-VIII of FIG. 7B. An optical fiber with a connector 100A according to a modification differs from the optical fiber with the connector 100, in that an optical fiber 2A is provided instead of the optical fiber 2 and a boot 8A is attached to a ferrule 3 instead of the boot 8.

The optical fiber 2A is attached to the optical connector (in particular, the ferrule 3). The number of the optical fibers 2A is equal to the number of the holding holes 13h. For example, the number of the optical fibers 2A is eight. The optical fiber 2A includes, for example, four TX fibers and four RX fibers. Each of the optical fibers 2A includes one end portion 21, an extension portion 24, and an intermediate portion 23 between the one end portion 21 and the extension portion 24. The one end portion 21 is located at the inside of the ferrule 3. The extension portion 24 is located at the outside of the ferrule 3. That is, the optical fiber 2A extends to the outside of the ferrule 3 beyond the second end surface 12s.

The plurality of optical fibers 2A is integrated by being covered with a tape covering in a lump in the extension portion 24. That is, the plurality of optical fibers 2A is integrated in the outside of the ferrule 3. In addition, the plurality of optical fibers 2A is divided into two groups (that is, divided into two parts) by division of the tape covering in the intermediate portion 23. As one example, in a case where eight optical fibers 2A are present, the eight optical fibers 2A are divided into two groups each having four optical fibers in the intermediate portion 23. At least a part of each intermediate portion 23 is disposed inside the ferrule 3 together with the boot 8A. Therefore, the plurality of optical fibers 2A is divided into two parts in the inside of the ferrule 3.

The plurality of optical fibers 2A is integrated by being covered with a tape covering in each group in the intermediate portion 23. Furthermore, the plurality of optical fibers 2A is not covered with the tape covering in the one end portion 21 and is not integrated. More specifically, each of the optical fibers 2A includes a glass fiber and a fiber covering that covers the glass fiber. In the optical fiber 2A, the tape covering is removed and the fiber covering remains at a part of the intermediate portion 23 side in the one end portion 21. Furthermore, in the optical fiber 2A, the tape covering and the fiber covering are removed and the glass fiber is exposed at a part of a side (front end side) opposite to the intermediate portion 23 in the one end portion 21. The one end portion 21 of the optical fiber 2A, for example, is located in the fiber arrangement groove 13g at a part where the glass fiber is exposed, and is inserted into the holding hole 13h.

For example, an adhesive is disposed at a part P of a boundary between the intermediate portion 23 and the extension portion 24, that is, a part P from which the division of the tape covering starts, and the part P is reinforced such that the division does not unintentionally progress to the extension portion 24 side.

The boot 8A is formed in, for example, a rectangular shape. A part of the boot 8A is inserted from the opening 14a of the frame portion 14 in the second end surface 12s to the inside (space 14s) of the ferrule 3. The remaining part of the boot 8A is exposed from the second end surface 12s to the outside of the ferrule 3. A pair of through-holes 8h are formed in the boot 8A. A plurality of optical fibers 2A is inserted into each of the through-holes 8h for each group in a lump.

Herein, a part of the intermediate portion 23 of the optical fiber 2A is disposed inside the through-hole 8h. The plurality of optical fibers 2A is disposed inside the ferrule 3 through the boot 8A and extends to the outside of the ferrule 3. The boot 8A is bonded to the ferrule 3 by, for example, a resin adhesive.

As described above, the ferrule 3 includes the first end surface 11s facing another ferrule (optical connection member) at the time of optical connection and the holding portion 13 holding the optical fiber 2 at the holding hole 13h. The first end surface 11s includes a first area A1, a second area A2, and a third area A3. Openings 13a of the holding holes 13h are arranged in a row in the first area A1 and the third area A3. The center interval between the openings 13a mutually adjacent through the second area A2 is larger than the center interval between the openings 13a mutually adjacent in the first area A1 and the third area A3. That is, the plurality of optical fibers 2 is divided into a group G1 held in the holding holes 13h opened in the first area A1 and a group G3 held in the holding holes 13h opened in the third area A3. Due to this, the number of the optical fibers 2 is reduced as compared with a case where the holding holes 13h opened in the second area A2 are formed to further hold the optical fibers 2. Therefore, the waste of the optical fibers 2 is suppressed.

In the ferrule 3, the opening 13a is not provided in the second area A2. Therefore, according to the ferrule 3, while reducing the number of the optical fibers 2, it is possible to suppress the ingress of a polishing agent from the opening 13a at the time of polishing the first end surface 11s.

Furthermore, as described above, the plurality of optical fibers 2 is divided into two groups G1 and G3. That is, as compared with a case where all the plurality of optical fibers 2 are arranged in a row as one group, the number of the optical fibers 2 arranged per group is reduced. Therefore, the variation in protrusion amount from the first end surface 11s of the optical fiber 2 is reduced. Therefore, it is possible to suppress the occurrence of the variation in the pressing force between the optical fibers 2 and improve the stability of the optical connection. This point will be described in detail.

Figure 9A:
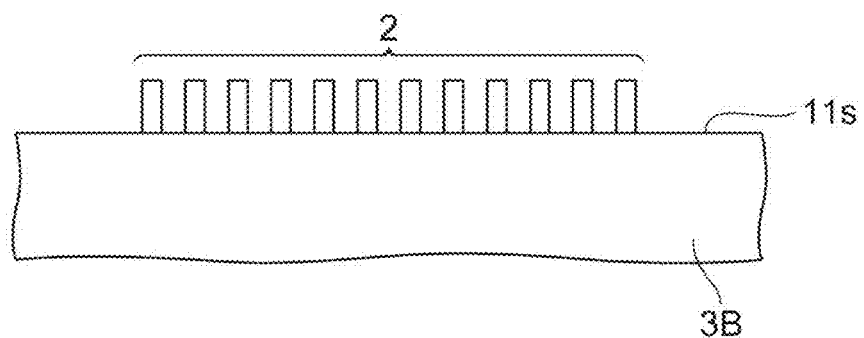
FIG. 9A is a diagram illustrating a state (ideal state) in which a variation in a protrusion amount of an optical fiber is zero.
Figure 9B:
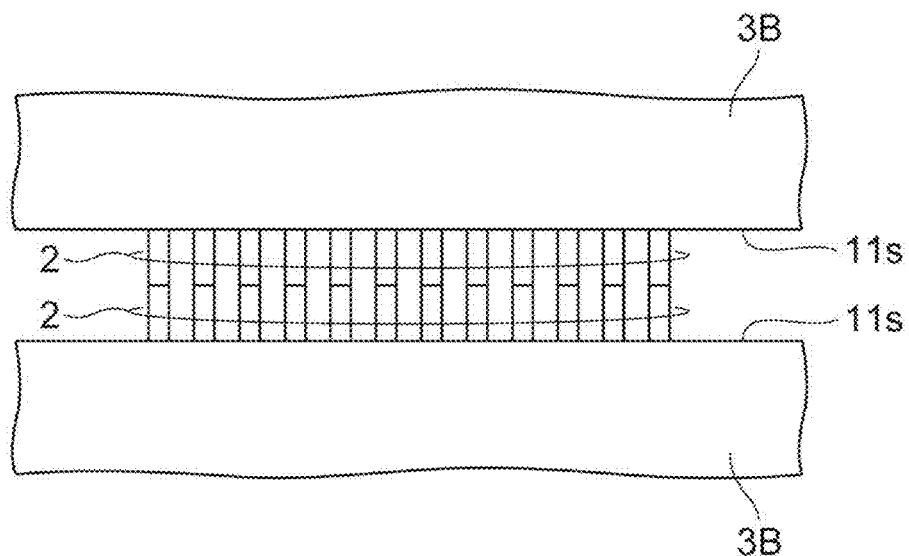
FIG. 9B is a diagram illustrating an aspect of optical connection of the optical fiber in the ideal state.

When the ferrule holding the optical fiber is used for optical connection, there is a case where the end surface (for example, the first end surface 11s) of the ferrule is polished. When the end surface of the ferrule is polished, there is a case where the protrusion amount of the optical fiber from the end surface varies. The variation in protrusion amount may lower the stability of the optical connection. FIG. 9A is a diagram illustrating a state (ideal state) in which the variation in protrusion amount of the optical fiber is zero. FIG. 9B is a diagram illustrating an aspect of optical connection of the optical fiber in the ideal state.

As illustrated in FIG. 9A, herein, the protrusion amounts of the plurality of optical fibers 2 from the first end surface 11s of the ferrule 3B are equal to each other. Therefore, as illustrated in FIG. 9B, at the time of optical connection of the optical fibers 2, when the plurality of optical fibers 2 protruding from the first end surface 11s of one ferrule 3B abuts against the plurality of optical fibers 2 protruding from the first end surface 11s of another ferrule 3B, the pressing force (for example, 0.8 N) is uniformly applied to each of the optical fibers 2. Therefore, the optical connection is stably performed.

Figure 10A:
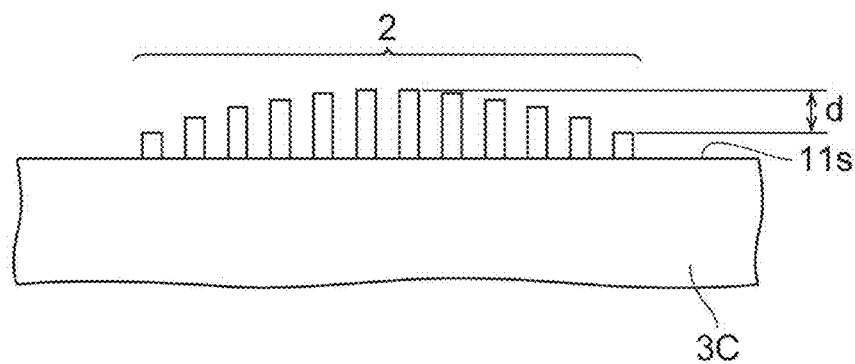
FIG. 10A is a diagram illustrating an end surface of a ferrule of a traditional 12 ct fiber as a comparative example.
Figure 10B:
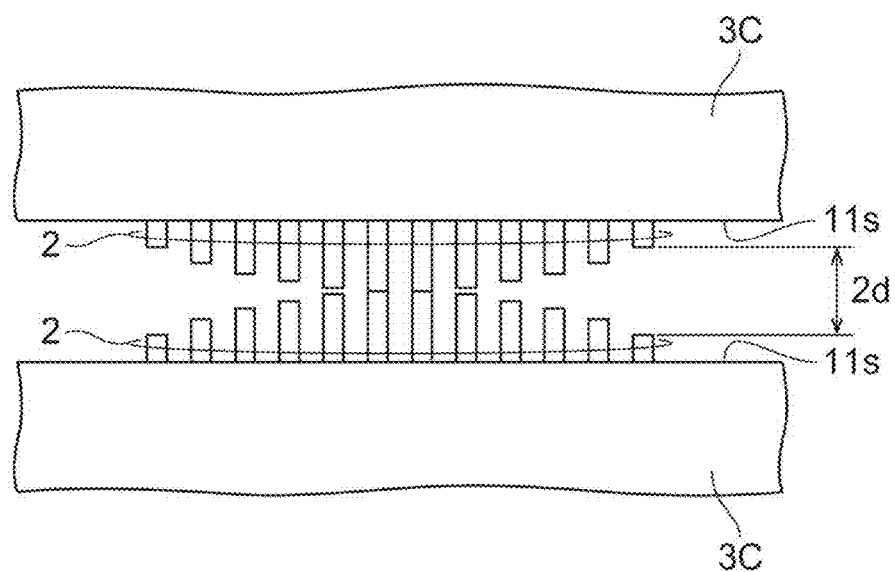
FIG. 10B is a diagram illustrating an aspect of optical connection of an optical fiber in a comparative example.

FIG. 10A is a diagram illustrating an end surface of a ferrule of a traditional 12 ct fiber as a comparative example. FIG. 10B is a diagram illustrating an aspect of optical connection of the optical fiber in the comparative example. In this case, as illustrated in FIG. 10A, due to the polishing of a first end surface 11s of a ferrule 3C, the protrusion amount of the optical fiber 2 is highest in the center portion of the first end surface 11s and decreases toward both end portions of the first end surface 11s. That is, the variation occur in the protrusion amount of the optical fiber 2. Herein, the maximum value d of the variation in the protrusion amount of the optical fiber 2 is a value obtained by subtracting the protrusion amount of the optical fiber 2 at the end portion from the protrusion amount of the optical fiber 2 at the center. The maximum value d increases as the number of arrangement of the optical fibers 2 increases.

As illustrated in FIG. 10B, at the time of optical connection under such a situation, although the optical fibers 2 at the center portion are sufficiently in contact with each other, the optical fibers 2 on the end portion side are separated from each other by a distance 2d that is twice the maximum value d. Therefore, a sufficient pressing force is applied to the optical fibers 2 in the center portion, but there is a case where a sufficient pressing force is not applied to the optical fibers 2 on the end portion side. That is, there is a possibility that the pressing force between the optical fibers 2 will vary and the optical connection between the optical fibers 2 will become unstable.

Figure 11A:
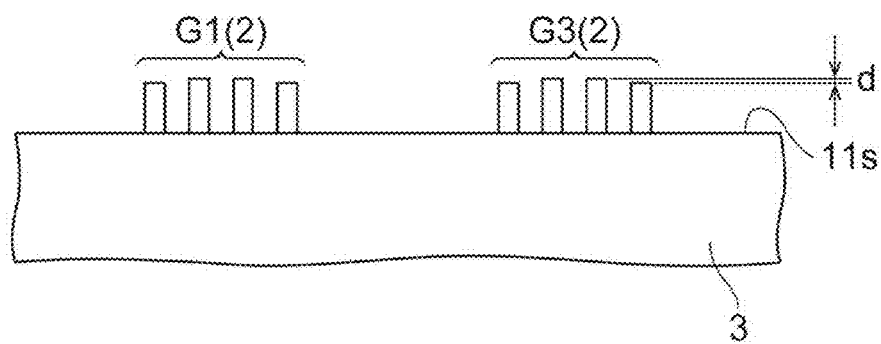
FIG. 11A is a diagram illustrating an end surface of a ferrule in the present embodiment.
Figure 11B:
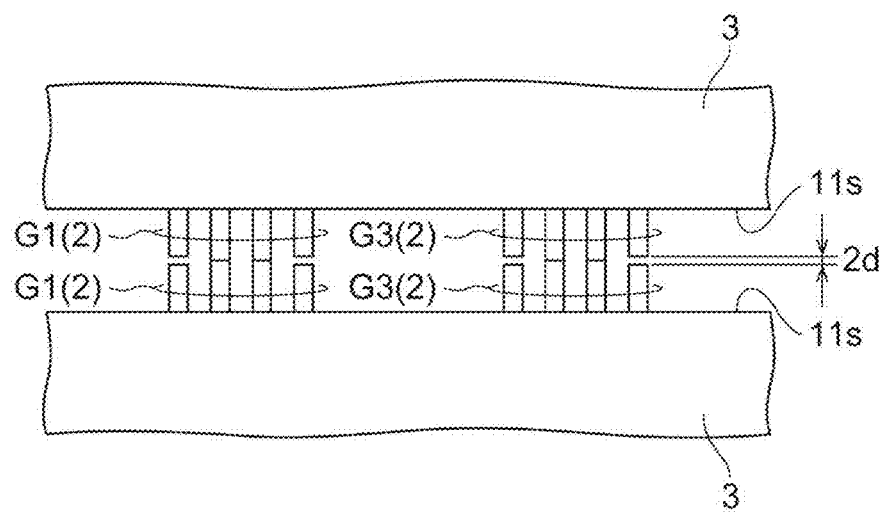
FIG. 11B is a diagram illustrating an aspect of optical connection of an optical fiber in the present embodiment.

FIG. 11A is a diagram illustrating an end surface of a ferrule in the present embodiment. FIG. 11B is a diagram illustrating an aspect of optical connection of the optical fiber in the present embodiment. As described above, in the ferrule 3, the plurality of optical fibers 2 are divided into two groups G1 and G3 and respectively arranged in the first area A1 and the third area A3 of the first end surface 11s.

Therefore, the number of arrangement of the optical fibers 2 in each group is, for example, four, which is less than in the case of the above-described conventional ferrule 3C. Therefore, as illustrated in FIG. 11A, the variation in protrusion amount from the first end surface 11s of the optical fiber 2 occur in each of the groups G1 and G3, but the maximum value d also decreases as the number of arrangement of the optical fibers 2 in each group decreases. As a result, as illustrated in FIG. 11B, the distance 2d between the optical fibers 2 on the end portion side in each group also becomes small. Therefore, it is possible to suppress the occurrence of the variation in the pressing force between the optical fibers 2 and improve the stability of the optical connection.

Figure 12A:
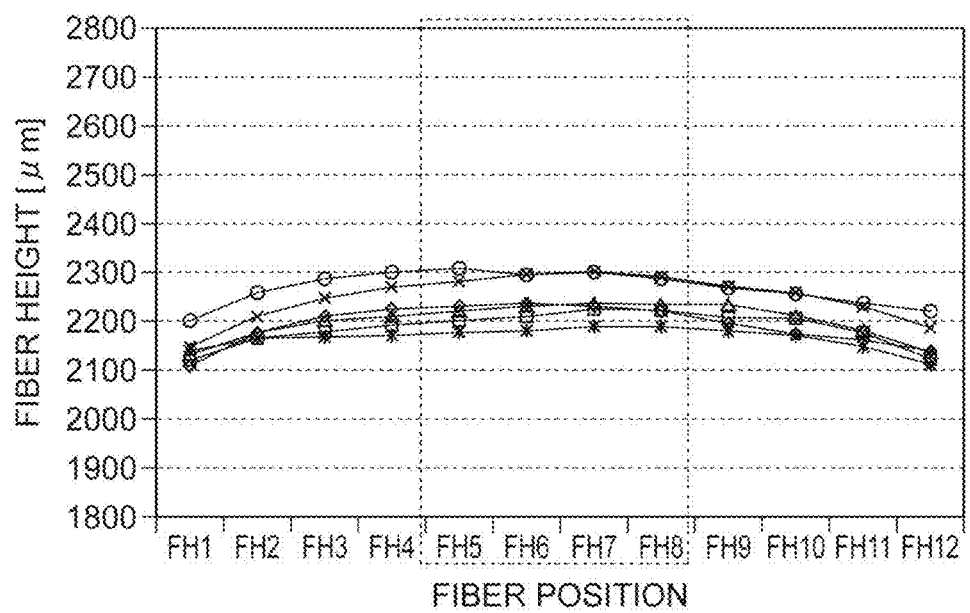
FIG. 12A is a graph showing a protrusion amount of an optical fiber in a comparative example.
Figure 12B:
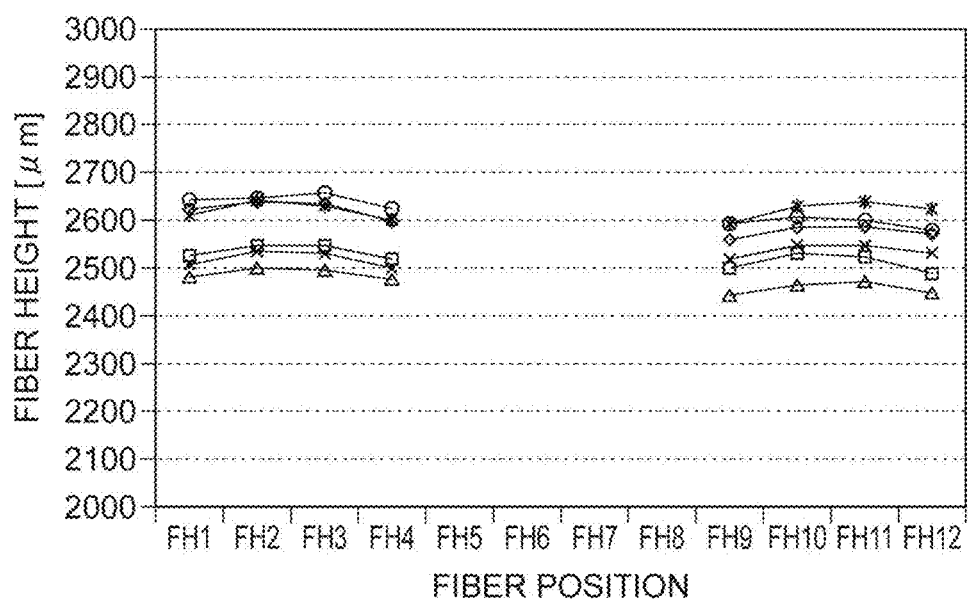
FIG. 12B is a graph showing a protrusion amount of an optical fiber according to the present embodiment.

Subsequently, an example of the protrusion amount of the optical fiber will be described with reference to each example. FIG. 12A is a graph showing a protrusion amount of an optical fiber in a comparative example. A comparative example is a ferrule and an optical fiber of a traditional 12 ct fiber. FIG. 12B is a graph showing a protrusion amount of an optical fiber in an example according to the present embodiment. A fiber height in FIGS. 12A and 12B is the protrusion amount of the optical fiber from the end surface of the ferrule. In addition, in the example of FIG. 12A, the optical fibers are arranged at the respective fiber positions of FH1 to FH12, and in the example of FIG. 12B, the optical fibers are arranged at the respective fiber positions of FH1 to FH4 and FH9 to FH12.

In the example illustrated in FIG. 12A, the measurement result (the number of samples was six) of the maximum value d of the variation in the projection amount of the optical fiber was as follows. In the example illustrated in FIG. 12A, each value was calculated except for four optical fibers in the center portion (the portion surrounded by the broken line in FIG. 12A).

An average value of the maximum value d of the six samples: 99 nm.

A standard deviation $\sigma$ of the maximum value d of the six samples: 20.2 nm.

A maximum value of the maximum value d among the six samples: 124 nm.

A minimum value of the maximum value d among the six samples: 68 nm.

On the other hand, in the example illustrated in FIG. 12B, the measurement result (the number of samples was six) of the maximum value d of the variation in the projection amount of the optical fiber was as follows.

An average value of the maximum value d of the six samples: 61 nm.

A standard deviation $\sigma$ of the maximum value d of the six samples: 12.8 nm.

A maximum value of the maximum value d among the six samples: 78 nm.

A minimum value of the maximum value d among the six samples: 45 nm.

As described above, in the example of FIG. 12B, as compared with the example of FIG. 12A, it was confirmed that the number of arrangement of the optical fibers was reduced from 12 to 4, and thus the average value and the standard deviation $\sigma$ of the protrusion amount of the optical fiber can be reduced to about ⅔.

In the above-described embodiment, the examples of the optical connection member, the optical connector, and the optical fiber with the connector according to the present subject matter have been described. Therefore, the optical connection member, the optical connector, and the optical fiber with the connector according to the present subject matter are not limited to those described above. The optical connection member, the optical connector, and the optical fiber with the connector according to the present subject matter can be arbitrarily modified as described above without departing from the scope of each claim.

REFERENCE SIGNS LIST 1 optical connector
1M MPO connector
2, 2A optical fiber
21 one end portion
22 other end portion
3, 3B, 3C ferrule (optical connection member)
4 housing
5 fixing member
6 boot
7 coupling
8, 8A boot
8h through-hole
11s first end surface (end surface)
12s second end surface
13 holding portion
13a opening
13h holding hole
13g fiber arrangement groove
13t taper portion
14 frame portion
14h guide pin insertion hole
14s space
14w window portion
21 one end portion
22 other end portion
23 intermediate portion
24 extension portion
100, 100A optical fiber with connector
A1 first area
A2 second area
A3 third area
G1, G3 group
P part
R region

The invention claimed is:

1. An optical fiber with a connector comprising:
an optical connector having an optical connection member used for optical connection of a plurality of optical fibers and a housing holding the optical connection member thereinside; and
the plurality of optical fibers attached to the optical connector,
wherein the optical connection member includes a first end surface facing another optical connection member at the time of the optical connection, a second end surface different from the first end surface, and a holding portion holding the plurality of optical fibers,
the holding portion is provided with a plurality of holding holes which are opened in the first end surface, extend from the first end surface in a first direction intersecting with the first end surface, and hold the plurality of optical fibers,
the first end surface includes a first area, a second area, and a third area which are sequentially arranged along a second direction intersecting with the first direction,
openings of the plurality of holding holes are arranged in a row in the second direction in the first area and the third area,
a center interval between the openings mutually adjacent through the second area is larger than a center interval between the openings mutually adjacent in the first area and the third area,
one end portions of the plurality of optical fibers are held in the holding holes in the holding portion,
the plurality of optical fibers is divided into two parts in the inside of the optical connection member,
the plurality of optical fibers is integrated at the second end surface, and
a part from which the division of the plurality of optical fibers starts is located inside the optical connection member.

2. The optical fiber with the connector according to claim 1, wherein in the plurality of optical fibers, a covering is removed in a portion located at the outside of the optical connection member.

3. The optical fiber with the connector according to claim 1, wherein other end portions of the plurality of optical fibers are attached to another optical connector.

4. The optical fiber with the connector according to claim 3, wherein the other optical connector has the same configuration as the optical connector.

* * * * *